United States Patent [19]

Schmidt et al.

[11] Patent Number: 4,500,763
[45] Date of Patent: Feb. 19, 1985

[54] METHOD AND APPARATUS FOR THE PRODUCTION OF WELDED GRID BODIES

[75] Inventors: Gerhard Schmidt; Klaus Ritter; Gerhard Ritter, all of Graz, Austria

[73] Assignee: EVG Entwicklungs- u. Verwertungs-Gesellschaft m.b.H., Graz, Austria

[21] Appl. No.: 372,478

[22] Filed: Apr. 28, 1982

[30] Foreign Application Priority Data

May 14, 1981 [AT] Austria ................. 2158/81

[51] Int. Cl.³ ............................. B23K 11/32
[52] U.S. Cl. ........................ 219/58; 219/56; 219/78.15; 219/79
[58] Field of Search ............ 219/58, 78.15, 56, 79; 52/309.4, 309.7, 577

[56] References Cited

U.S. PATENT DOCUMENTS 3,676,632 7/1972 Ritter et al. ................. 219/58
4,120,330 10/1978 Weismann ................... 219/56

FOREIGN PATENT DOCUMENTS 2156204 6/1972 Fed. Rep. of Germany ........ 219/56

Primary Examiner—Roy N. Envall, Jr.
Assistant Examiner—Alfred S. Keve
Attorney, Agent, or Firm—Ernest F. Marmorek

[57] ABSTRACT

Grid bodies which consist of two parallel plane grid mats of longitudinal and transverse wires crossing one another and welded together at the points of cross, and of spacer wires, which hold the mats spaced apart and which are welded at each end to one wire of one of the two grid mats, are produced in a continuous method and in such a way that if necessary an insulating core may be introduced into the grid body during its production. For this purpose two widths (3,4) of grid matting are drawn off in steps from stock coils (1,2), straightened and arranged at a distance apart. Simultaneously a number of wires (22,23) are drawn off in steps from stock coils (20,21), straightened and introduced through one (3) of the widths (3,4) of grid matting from the side into the gap between the widths of grid matting, welded to one wire in each width of grid and separated from the wire stock.

8 Claims, 8 Drawing Figures

METHOD AND APPARATUS FOR THE PRODUCTION OF WELDED GRID BODIES

The invention refers to a method and apparatus for the production of welded grid bodies of the kind, hereinafter referred to as of the kind described, which comprise two parallel plane grid mats of longitudinal and transverse wires crossing one another and welded together at the points of cross, and of straight spacer wires cut to length and welded at each end to one wire of a respective one of the two grid mats to hold the grid mats at a predetermined distance apart.

Three dimensional grid bodies of this kind are used mainly as reinforcement for compound structural members, where the spacer wires of the grid body support a heat-insulating insulating core and the grid mats lying on opposite sides of this core form supporting parts and flat reinforcements for outer shells of concrete. Further, such three dimensional grid bodies, if they are made adequately stiff in shear, may also be applied as supporting structures after the style of gratings, upon which, if necessary, one can walk.

A method of producing three dimensional grid bodies of the kind described is known from the West German A/S No. 2314002. According to that known method, flat grid strips wound up into rolls are drawn off from the rolls, straightened, twisted by 90° into an upright position and fed in parallel with one another into a welding station in which the longitudinal wires of the flat grid strips, which are now lying in parallel at the top and the bottom, are welded on to transverse wires crossing them at right angles. These transverse wires form with the longitudinal wires of the flat grid strips grid mats which are held at a distance apart by the upstanding spacer wires running between the longitudinal wires of the flat grid strips.

In the case of this production method, the introduction of an insulating core into the grid body is possible only afterwards in a special core-forming station. That may be done either by the grid body being embedded up to a small part of its thickness in a sand bed, whereupon polyurethane foam or the like is foamed onto the sand bed and allowed to set, or by a slab of an insulating foam such as STYROPOR or the like being cut into strips of appropriate dimensions, the width of which corresponds with the spacing of parallel flat grid strips in the grid body, and these strips are pushed singly into the gaps between the flat grid strips. Apart from the fact that, for the introduction of the insulating core special working steps are necessary in both cases, these working steps are moreover also extremely timewasting in each of the two cases.

The invention is therefore concerned with the problem of creating a method of production of a three dimensional grid body of the kind described, which makes it possible in a simple way to introduce an insulating core into the grid body during its production, as is required for prefabricated compound structural members, but which optionally also makes possible the production of coreless grid bodies for supporting structures after the style of gratings.

This problem is solved in accordance with the invention, by a method of producing welded grid bodies of the kind described, wherein two widths of grid matting are drawn off in steps from stock coils, straightened and brought into position in parallel with one another at a distance apart corresponding with the desired thickness of the grid body, and simultaneously a number of wires are drawn off in steps from stock coils, straightened and introduced as spacer wires laterally through one of the two widths of grid matting into the gap between the widths of grid matting in such a way that each spacer wire comes to lie close to one grid wire of both widths of grid matting, whereupon the spacer wires are welded to the adjacent grid wires and severed from the wire stock.

This new method, in which a start is made from prefabricated coiled widths of grid matting and coiled stocks of wire for the spacer wires, enables a very rational continuous production of the grid body, especially since in the rhythm of the steps of production only short pieces of wire have to be pushed forward, cut to length, and welded to the widths of grid matting, so that a high rate of production may be maintained.

The stiffness of the grid body may be increased if the spacer wires are introduced obliquely into the gap between the widths of grid matting alternately in opposite senses in planes in which stiffening of the grid body is to be produced, and which run perpendicular to the planes of the widths of grid matting, and are welded in their oblique positions to the widths of grid matting. An all-round stiffness in shear is necessary especially in the case of employment of the grid body as a supporting structure after the style of a grating.

For the production of structural members having an insulating core, a slab of heat-insulating material may be introduced into the gap between the two parallel widths of grid matting but spaced from each width of grid matting, and the leading ends of the spacer wires, upon their introduction into the gap between the widths of grid matting, are pushed through this slab. Particularly in the case of the use of an insulating core of thermoplastic material, at least the leading end portions of the spacer wires are advantageously heated before being pushed through the slab of heat-insulating material.

For use in carrying out the new method, in accordance with a further aspect of the invention, apparatus is characterized by carriers for two stock coils of widths of grid matting, arranged on opposite sides of a channel for production of the grid body; straightener mechanisms for straightening grid matting from respective ones of the coils; curved guide devices for leading respective ones of the straightened widths of grid matting tangentially into opposite longitudinal sides of the production channel; carriers for at least one group of spacer wire stock coils at the side of the production channel and from which wire feedways run transversely to the production channel, the feedways being associated with straightener mechanisms, with wire feed mechanisms which work in steps and with shears; a first welding device, on the opposite side of the production channel to, and in alignment with, the wire feedways, for welding the leading ends of the wires to one width of the grid matting; and a second welding device, on the same side of the production channel as, and downstream in the direction along the production channel of, the wire feedways, for the welding of the trailing ends of the cut wires onto the other width of grid matting.

The features described above and further features of the invention are explained in more detail below, by reference to the accompanying drawings, in which.

Figure 1:
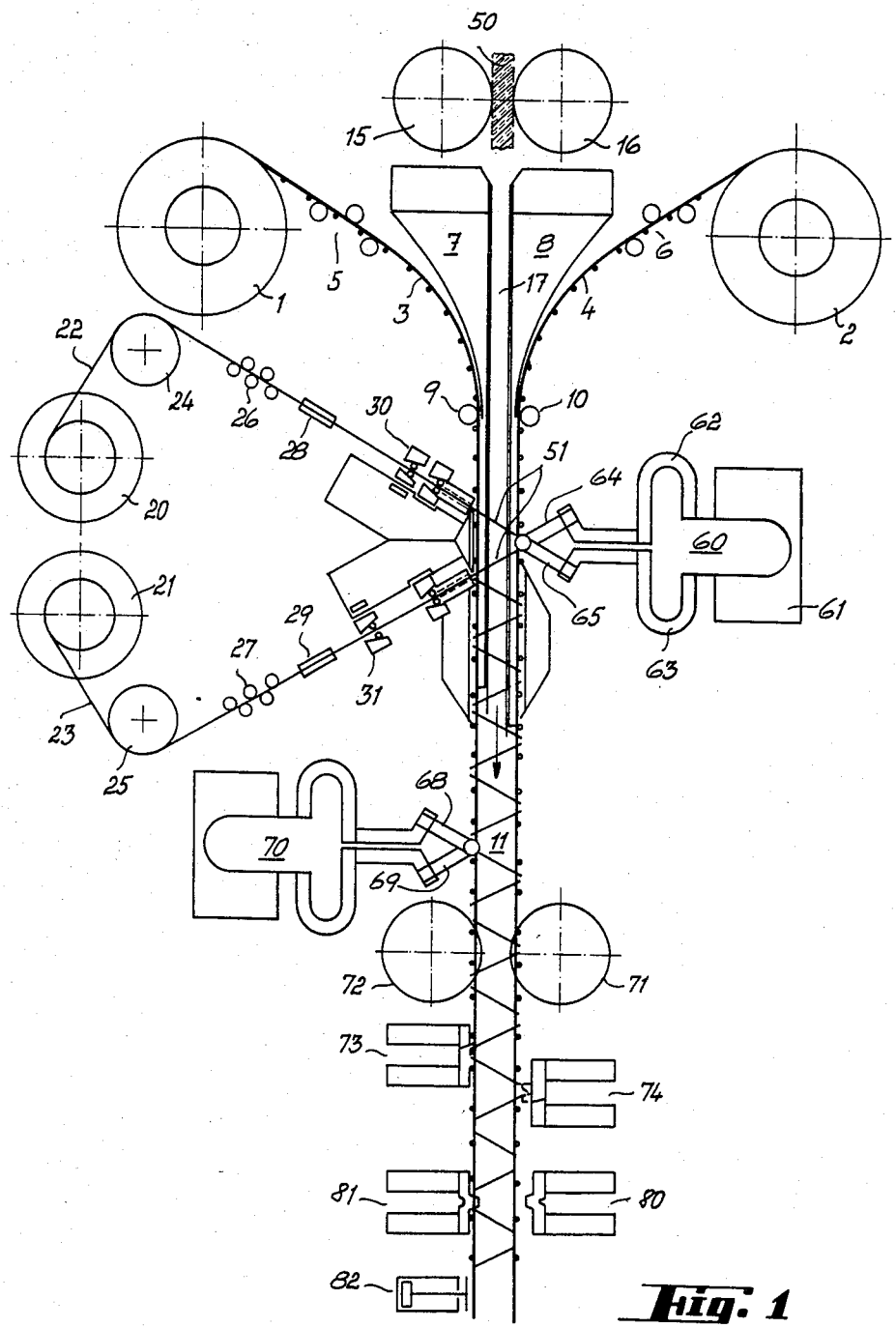
FIG. 1 is a diagramatic plan of apparatus in accordance with the invention.

In the diagrammatic plan of in FIG. 1, of an apparatus in accordance with the invention for producing three dimensional grid bodies, for the sake of clarity only the various operational members, arranged along a production channel 11 emphasized by an arrow are shown, but not their support from the stand of the machine. As shown in FIG. 1, widths 3, 4 of grid matting are drawn off from two stock coils 1 and 2 and first of all pass through straightening mechanisms 5 and 6, respectively, in which they get straightened. By means of slightly curved guide devices 7, 8 which deform only elastically the flattened widths of grid, and thereafter guide rollers 9, 10, the widths 3 and 4 are guided into parallel positions in the production channel 11, where their distance apart corresponds with the required thickness of the three-dimensional grid body which is to be produced.

The widths 3, 4 then run through a welding station in which, as is explained more precisely later, short straight spacer wires are introduced and pass through the gap between the two widths and first of all get welded to one of the two widths.

Two feed rolls 15, 16 may, if necessary, grip a long slab like insulating core, for example, a slab of STYROPOR, by frictional contact and push it forward through a feed channel 17 formed for this purpose between the guide devices 7 and 8, so that it comes to lie in the welding station in parallel with the widths 3, 4 of grid matting and at a distance from them on both sides.

In the region of the welding station but at a distance from it, stock coils 20, 21 for spacer wires are arranged one behind the other in the direction perpendicular to the plane of the drawing in FIG. 1. The wires 22, 23 drawn off from the stock coils 20, 21 run over guide rollers 24, 25 to straightening mechanisms 26, 27 and if necessary through heater devices 28, 29 and arrive at similarly constructed feed mechanisms 30, 31 which draw the wires off from the stock coils 20, 21, in synchronism with the working of the machine, and feed them into the welding station.

Figure 2:
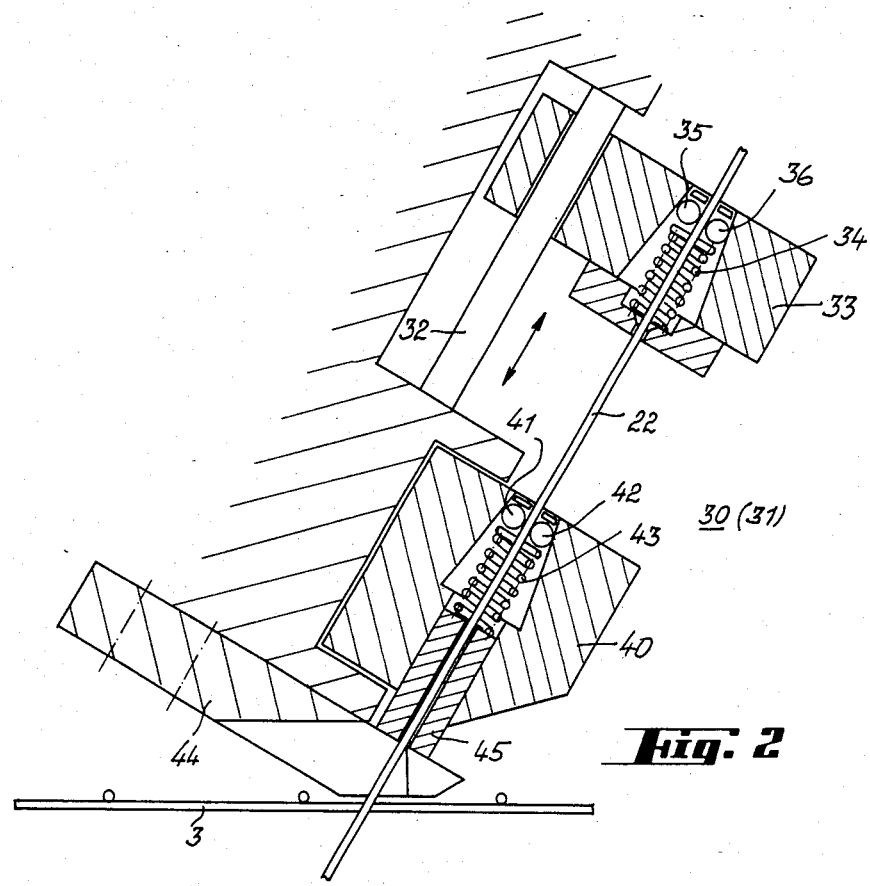
FIGS. 2 and 3 show, in section, examples of spacer wire feed mechanisms.
Figure 3:
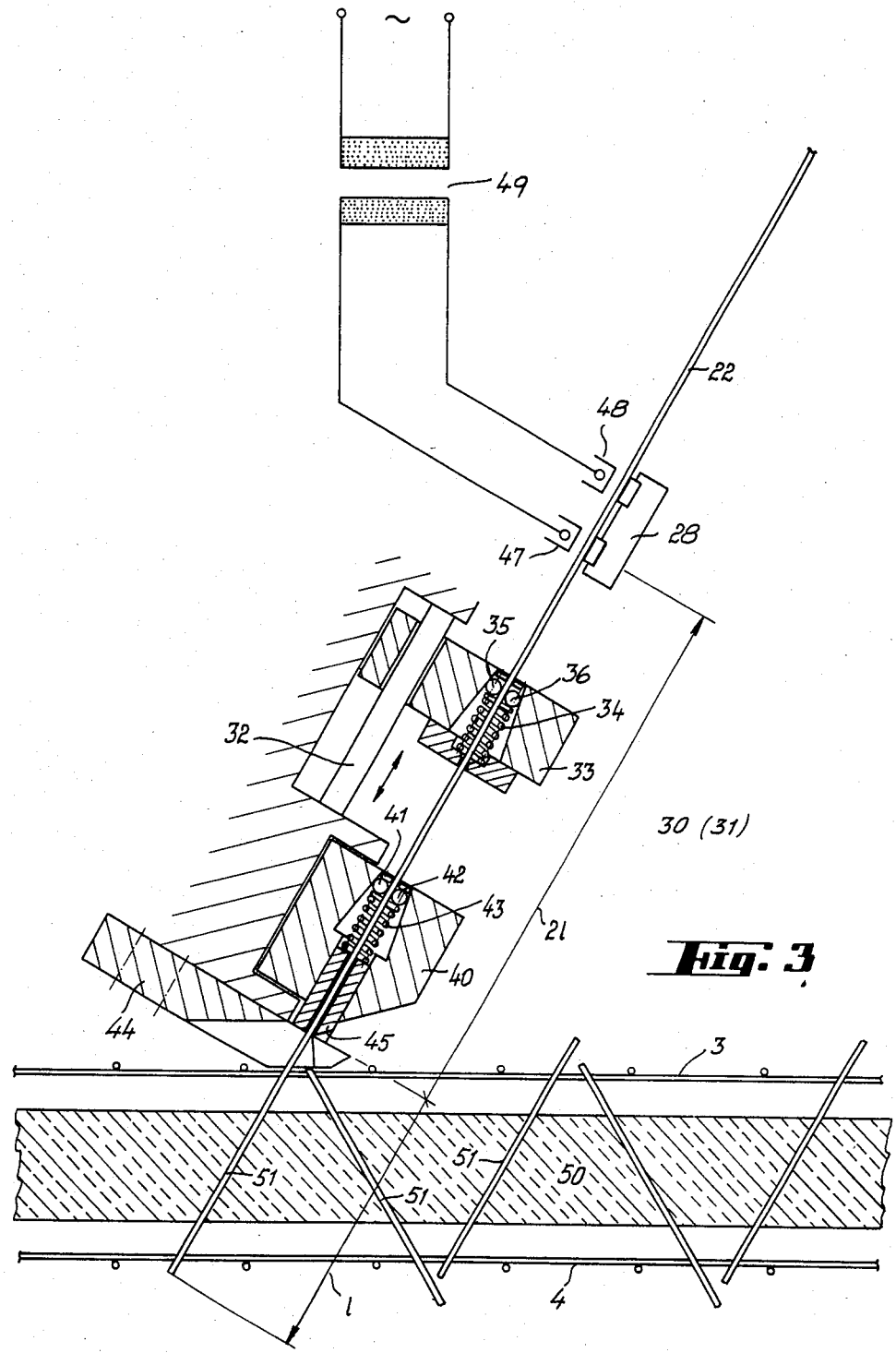

Each of the feed mechanisms 30, 31 illustrated in detail in FIGS. 2 and 3 by way of example, has a feed clamp 33, which can be slid to and fro along a guide rail 32 by known means, for example, hydraulic pistons, and in a tapering bore in which clamp balls 35, 36 (or clamp rollers) are supported and are loaded by a spring 34. A return stop 40 cooperates with the feed clamp 33 and likewise has clamp balls 41, 42 (or clamp rollers) supported in a tapering bore and loaded by a spring 43. A knife 44 cooperating like a shear with a cutting edge of an outlet guide 45 from the return stop 40, for cutting off the wire 22 which has been fed forward, completes the feed mechanism 30. The knife 44 may consist of a beam extending across the width of the machine and having individual slots for the wires 22 to pass through. The cut is effected simultaneously for all of the wires seized by the knife 44, by sideways motion of the knife.

The feed mechanism as in FIG. 3 differs from that as in FIG. 2 only in the presence of a heater device 28. This heater device consists of two electrodes 47, 48 which are fed from a transformer 49 and cause a flow of electrical current in a short section of wire which is strongly heated in this way.

The action of this feed mechanism is as follows:

Upon the movement of the feed clamp 33 in the direction towards the return stop 40 the clamp balls 35, 36 are pressed against the wire 22 by the wall of the tapering bore containing it, and in addition under the action of the spring 34, and carry the wire 22 along with them. The wire is thereby drawn off from the stock coils 20, 21 and through the straightener mechanism 26, 27. The section of wire lying in front of the feed clamp 33 pushes the clamp balls 41, 42 of the return stop 40 in the direction towards the spring 43 and towards the wider end of the tapering bore. The clamp balls 41, 42 therefore oppose this movement of the wire 22 with practically no resistance. The movement continues until the front end of the wire has passed through the whole space bounded by the widths 3, 4 of the grid matting.

If in the space between the widths 3, 4 there is a slab 50 of heat-insulating material, say, of STYROPOR, polyurethane or the like, this gets pierced, as if by a nail, by the leading section 51 of the spacer wires 22, 23. Tests have shown that the piercing of the insulating core 50 is considerably facilitated by heating at least the tip of the wire. This purpose is served by the heater device 28 which is associated with the outlet guide 45 at the distance 2 l from the end, l being the length of travel of the wire 22, 23 covered during one step of the feed.

As soon as the piece of the wire 51 which has been fed forward has been severed by means of the knife 44, the feed clamp 33 returns into its starting position, whereupon the clamp balls 41, 42 secure the spacer wire 22, 23 in its position, but the clamp balls 35, 36 release it.

Opposite the feed mechanisms 30, 31 lies a welding mechanism 60 which connects the pieces 51 of the spacer wires 22, 23, which have been fed forward, to the width 4 of grid matting.

Figure 4:
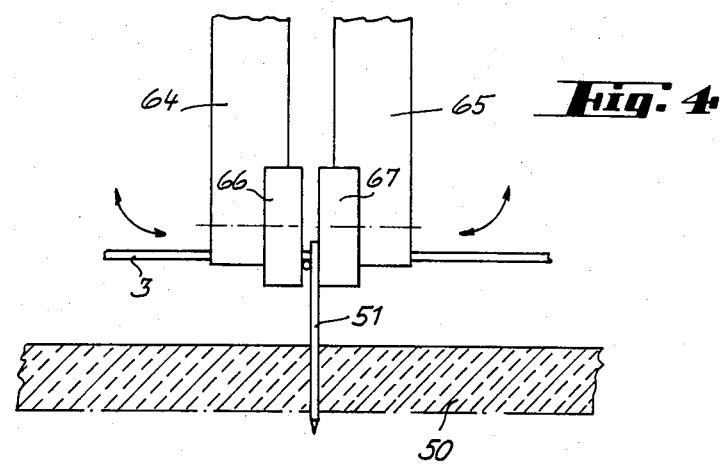
FIG. 4 shows, in section, an example of a welding device.

The welding mechanism 60 consists of a transformer 61, flexible supply leads 62, 63 which connect the secondary output from the transformer to the electrode holders 64, 65, as shown in FIG. 4, and electrodes 66, 67. As indicated in FIG. 4 by arrows, the electrode holders 64,65 form the cheeks of welding tongs which may be swung into the plane of the width of grid matting in order to weld a piece 51 of wire onto a grid wire, or can be swung out of the plane of the width of grid again in order to release the grid body for onwards conveyance.

Finally a welding mechanism 70, the construction of which is completely the same as that of the welding mechanism 60 which has just been described, and which is equipped with welding tongs 68, 69 and lies further downstream in the direction of feed of the grid body which is to be produced, connects the cut ends of the pieces 51 of wire to the width 3 of grid matting. The distance apart of the two welding mechanisms 60 and 70 is so chosen that both welding mechanisms can seize simultaneously the closely adjacent ends of two pieces 51 of wire arranged obliquely in opposite directions, that is, in the form of a V, and weld them to the associated width of grid matting.

Figure 5:
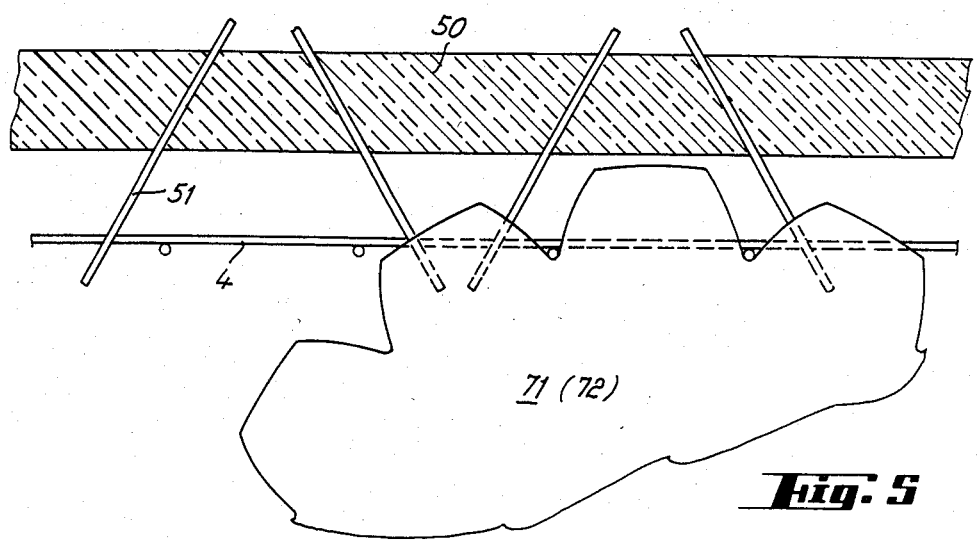
FIG. 5 is a section showing a feed-mechanism for the grid body.

The grid body is conveyed by two toothed discs 71, 72, which engage in the widths 3 and 4. respectively, and which, as shown in FIG. 5, seize the transverse wires of the grid matting positively. The toothed discs are driven intermittently, pulling the grid body forward by an amount which corresponds with the required distance apart of adjacent pieces 51 of wire arranged in the shape of a V, and then remain stationary until the feeding of new pieces of wire and welding of them to the widths of grid has been completed, whereupon the next feed step is effected.

Figure 6:
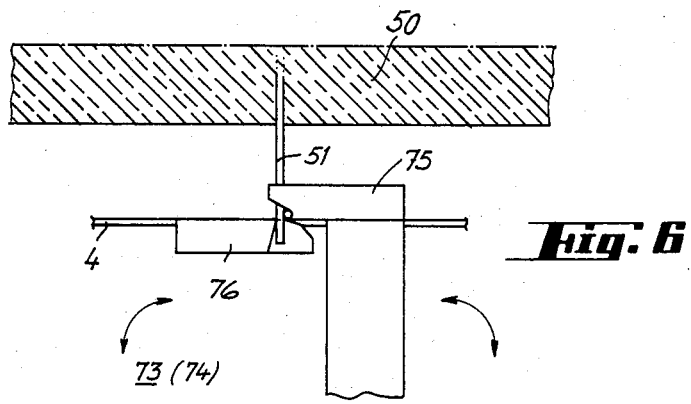
FIG. 6 shows, in section, a trimming shear for the elimination of overhanging lengths of spacer wire; and, FIGS. 7 and 8 show a shear for cutting the grid body to length, in two sections taken at right angles.

The overhanging lengths of the pieces 51 of wire are cut off by trimming shears 73, 74. Each trimming shear 73, 74 consists, as shown in FIG. 6, of two cheeks 75, 76 which are supported so as to be able to swing in the direction of the arrows in FIG. 6. Whilst the cheek 75 forms an abutment for a wire of a width of grid, the cheek 76 acts as the knife, which shears off the overhanging length of the piece 51 of wire in the direction towards the wire of the width of grid matting, which is secured by the cheek 75.

Figures 7, 8:
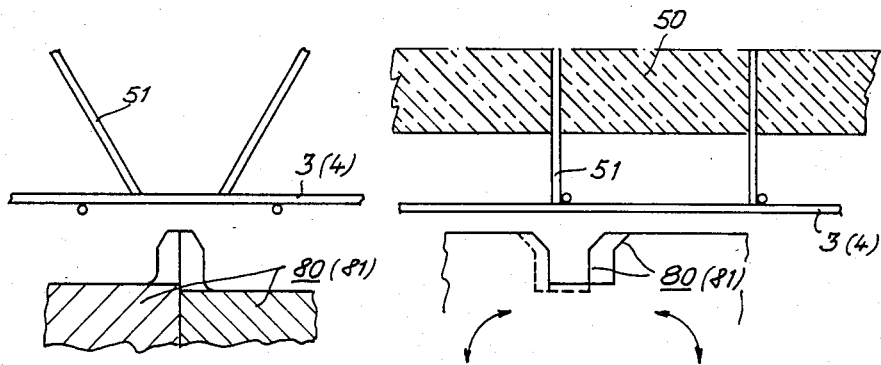

Finally shears 80, 81 are also provided for the longitudinal wires and can be inserted into the grid body from outside. FIG. 7 shows one of these shears diagrammatically in the position of rest, looking in the direction in parallel with the transverse wires 7 of the widths 3 or 4. FIG. 8 shows the same shear looking in the direction in parallel with the longitudinal wires of the widths of grid matting. The two shear knives are made to be able to move with respect to one another in the direction of the arrows in FIG. 8, in order to sever the longitudinal wires of the widths 3 or 4, respectively, and thereby separate sections of grid body of required lengths.

Finally jacks 82 are also provided, by means of which sections of grid body cut to length may be pushed away sideways out of the feedpath of the machine, in order to free the discharge path of the production channel for more sections of grid body to be manufactured.

Both the feed mechanisms 30, 31 with all of their accessories such as stock coils 20, 21, guide rollers 24, 25, etc., and also the welding mechanisms 60, 70 and the trimming shears 73, 74 are provided in alignment one behind the other in the direction perpendicular to the plane of the drawing in FIG. 1, repeated as many times as there are pairs of pieces 51 of wire which are to be welded between the widths 3, 4 of grid matting, in alignment one behind the other. In the same way the shears 80, 81 for the longitudinal wires have to be repeated in alignment one behind the other, perpendicular to the plane of the drawing in FIG. 1, that is, for each longitudinal wire of each of the two widths of grid matting one respective shear has to be provided.

One advantage of the method and apparatus disclosed herein for producing a three-dimensional grid body is that the thickness of the grid body so produced may be altered in a simple manner. To do this, all of the parts on one side (either the top or bottom) of the production channel 11, are preferably mounted on a single support (not shown) which can be moved toward or away from the production channel 11. The parts which are preferably mounted on the support include for example one set of guide devices for one of the widths of grid matting, one feed mechanism (30, 31) for the spacer wirer and one spacer wire welding device (60, 70). In particular cases, additional parts such as a feed roller (15, 16) for an insulating core, may also be mounted on the aforementioned support.

The direction in which the pieces 51 of wire are introduced into the gap between the two widths 3, 4 can be freely chosen within wide limits. As shown in FIG. 1, the spacer wires are preferably pushed in in oblique directions in opposite senses, where the oblique position may be referred to the longitudinal central plane and/or the transverse plane of the production channel and there exists only the prerequisite that the oblique wires come to lie both close to one longitudinal or transverse wire of the width 3 and also close to one longitudinal or transverse wire of the width 4, so that the ends of the spacer wires may be welded to the wires of the widths in question.

When the thickness of the grid body, to be produced, is to be altered, the angular position of the feed mechanism for the spacer wires must naturally also be altered simulataneously with the shifting of the associated spacer wire welding mechanism. Under certain circumstances alteration of the length of travel of the feed for the spacer wires will also be necessary so that lengths of overhang of spacer wire which are too long do not occur.

The diverging spacer wires stiffen the grid body against loadings in shear and can secure a section of insulating core through which they pass, immovably with respect to the two aforesaid grid mats.

We claim:

1. A method of producing a welded grid body which comprises two parallel plane grid mats of longitudinal and transverse wires crossing one another and welded together at the point of cross, and of straight spacer wires cut to length and welded at each end to one wire of a respective one of said two grid mats to hold said grid mats at a predetermined distance apart, wherein two widths of grid matting are drawn off in steps from stock coils thereof, straightened and brought into position in a production channel in parallel with one another at a distance apart corresponding with the desired thickness of said grid body, and simultaneously a number of wires are drawn off in steps from stock coils thereof, located on one side of the production channel, straightened and introduced as spacer wires laterally through one of said two widths of grid matting into the gap therebetween in such a way that each of said spacer wires comes to lie close to one grid wire of both said widths of grid matting, welding leading edges of said spacer wires to one of said widths of grid matting at a first location along said production channel, welding trailing edges of said spacer wires to the other of said widths of grid matting at a second location along said production channel, wherein a slab of heat-insulating material is introduced into said gap between said two parallel widths of grid matting but spaced from each of said widths, and leading ends of said spacer wires, upon their introduction into said gap between said widths of grid matting, are passed through said slab.

2. A method according to claim 1, wherein at least leading end portions of said spacer wires are heated before being passed through said slab of heat-insulating material.

3. Apparatus for producing a welded grid body which comprises two spaced apart parallel grid mats of longitudinal and transverse wires, and spacer wires cut to length and welded at each end to one of said grid mats, said apparatus comprising a channel for production of said grid body; two stock coil carriers for widths of grid matting arranged on opposite sides of said production channel; straightener mechanisms for straightening grid matting drawn from respective ones of said stock coil means; curved guide devices for leading respective ones of said straightened widths of grid matting tangentially into opposite longitudinal sides of said production channel; at least one group of spacer wire stock coil means positioned laterally of said production channel; wire feedways running from said spacer wire stock coil means transversely to said production channel, said feedways being associated with straightener mechanisms, with wire feed mechanisms adapted to work in cooperation with shears; first welding means, on the opposite side of said production channel to, and in alignment with, said wire feedways, for welding leading ends of said wires to one of said widths of grid matting; and a second welding device, on the same side of said production channel as, and downstream in the direction along said production channel of, said wire feedways, for welding trailing ends of said cut wires onto the other of said widths of grid matting, wherein, between said guide devices for said widths of grid matting, a feed channel is provided for an insulating core.

4. Apparatus according to claim 3, wherein feed rolls are provided for feeding said insulating core into said feed channel.

5. Apparatus according to claim 3, wherein heater devices are provided on said spacer wire feedways.

6. A method of producing a welded grid body comprising two parallelgrid mat portions separated by a slab of heat insulating material, and spacer wires cut to length and welded at each end to one of said grid mat portions, said method comprising the steps of
 (a) drawing off said grid mat portions from stock coils thereof;
 (b) straightening said grid mat portions and aligning said grid mat portions so that they are spaced apart by a distance corresponding to the desired thickness of said welded grid body;
 (c) introducing a slab of heat-insulating material into the space between said grid mat portions;
 (d) simultaneously drawing a plurality of spacer wires from stock coils thereof, straightening said spacer wires, and passing said spacer wires laterally through one of said grid mat portions and said slab of heat insulating material so that each of said spacer wires lies close to both of said grid mat portions; and
 (e) welding leading edges of said spacer wires to one of said grid mat portions at a first location along said production channel and welding trailing edges of said spacer wires to the other of said grid mat portions at a second location along said production channel.

7. The method of claim 6 wherein said spacer wires are heated before being passed through said slab of insulating material.

8. An apparatus for producing a welded grid body; said apparatus comprising: a channel for production of a grid body; two stock coil carriers for widths of grid matting, arranged on opposite sides of said production channel; straightener mechanisms for straightening grid matting from respective ones of said stock coil means; curved guide devices for leading respective ones of said straightened widths of grid matting tangentially into opposite longitudinal sides of said production channel; feed roll means for introducing heat insulating material between said widths of grid matting material, at least one group of spacer wire stock coil means positioned laterally of said production channel; wire feedways running from said spacer wire stock coil means transversely to said production channel, said feedways being associated with straightener mechanisms, with wire feed mechanisms adapted to work in steps and with shears; first welding means, on the opposite side of said production channel to, and in alignment with, said wire feedways, for welding leading ends of said wires to one of said widths of grid matting; and a second welding device, on the same side of said production channel as, and downstream in the direction along said production channel of said wire feedways, for welding trailing ends of said cut wires onto the other of said widths of grid matting.

* * * * *